(12) United States Patent
Ogawa (10) Patent No.: US 10,761,510 B2
(45) Date of Patent: Sep. 1, 2020

(54) MACHINE TOOL MANAGEMENT DEVICE

(71) Applicant: FUJI CORPORATION, Chiryu-shi (JP)

(72) Inventor: Masashi Ogawa, Toyota (JP)

(73) Assignee: FUJI CORPORATION, Chiryu-shi (JP)

( * ) Notice: Subject to any disclaimer, the term of this patent is extended or adjusted under 35 U.S.C. 154(b) by 100 days.

(21) Appl. No.: 16/077,582

(22) PCT Filed: Mar. 1, 2016

(86) PCT No.: PCT/JP2016/056282
§ 371 (c)(1),
(2) Date: Aug. 13, 2018

(87) PCT Pub. No.: WO2017/149665
PCT Pub. Date: Sep. 8, 2017

(65) Prior Publication Data
US 2019/0056713 A1 Feb. 21, 2019

(51) Int. Cl.
*G05B 19/409* (2006.01)
*G05B 19/18* (2006.01)

(52) U.S. Cl.
CPC .......... *G05B 19/409* (2013.01); *G05B 19/18* (2013.01); *G05B 2219/31472* (2013.01); *G05B 2219/36128* (2013.01)

(58) Field of Classification Search
CPC .................. G05B 19/18; G05B 19/409; G05B 2219/31472; G05B 2219/36128
See application file for complete search history.

(56) References Cited

U.S. PATENT DOCUMENTS

2012/0110490 A1* 5/2012 Keller .................. G06F 3/0484
715/771
2014/0046458 A1* 2/2014 Timsjo ................. G05B 19/409
700/28
(Continued)

FOREIGN PATENT DOCUMENTS

JP 6-63851 A 3/1994
JP 2004-314184 A 11/2004
(Continued)

OTHER PUBLICATIONS

International Search Report dated Apr. 12, 2016, in PCT/JP2016/056282 filed Mar. 1, 2016.

*Primary Examiner* — Chun Cao
(74) *Attorney, Agent, or Firm* — Oblon, McClelland, Maier & Neustadt, L.L.P.

(57) ABSTRACT

A machine tool management device including process screen display section configured to display a process screen on display, the process screen being a screen corresponding to each of multiple machine tool related processes; menu display section configured to display on the process screen each of a free menu at which it is possible to register any of the multiple machine tool related processes and a fixed menu at which specific processes of the multiple machine tool related processes are displayed; specific person authentication section configured to authenticate a specific person such that an entry operation via display is restricted to only the specific operator; and display menu changing section configured to receive an operation by an operator authenticated by specific person authentication section.

3 Claims, 9 Drawing Sheets

(56) References Cited

U.S. PATENT DOCUMENTS

2014/0368875 A1    12/2014  Sato
2015/0008845 A1*    1/2015  Kim .................. H05B 33/0845
                                                        315/292

FOREIGN PATENT DOCUMENTS

| JP | 2008-203910 A | 9/2008 |
| JP | 2009-271771 A | 11/2009 |
| JP | 2011-215793 A | 10/2011 |
| JP | 2015-1813 A | 1/2015 |
| JP | 2015-69510 A | 4/2015 |

* cited by examiner

MACHINE TOOL MANAGEMENT DEVICE

TECHNICAL FIELD

The present application relates to a machine tool management device for performing various processing related to machine tools that require management.

BACKGROUND ART

Disclosed in the patent literature 1 below are machine tools that consecutively perform specified processing on work that is sequentially conveyed by a conveyance device. Each of these machine tools is provided with a display, and a machine tool management device that manages the machine tools displays information related to the machine tools on the display, and, based on inputs from an operator to the display, it is possible to perform various processing related to the machine tools such as registration of information related to the machine tools and operation of the machine tools.

CITATION LIST

Patent Literature

Patent literature 1: JP-A-H6-63851

BRIEF SUMMARY

Problem to be Solved

By improving such a machine tool management device, it is possible to improve the practicality of the machine tool management device. From such a viewpoint, an object of the present disclosure is to provide a machine tool management device with high practicality.

Means for Solving the Problem

To solve the above problems, a machine tool management device of the present disclosure is for managing a machine tool including a display by performing multiple machine tool related processes that are processes related to the machine tool using the display, the machine tool management device including: a process screen display section configured to display a process screen on the display, the process screen being a screen corresponding to each of the multiple machine tool related processes;
a menu display section configured to display on the process screen each of
(a) a free menu at which it is possible to register any of the multiple machine tool related processes and
(b) a fixed menu at which specific processes of the multiple machine tool related processes are displayed,
the process screens corresponding to one of the multiple machine tool related processes being displayed on the display by the process screen display section such that the menus are used for an operator to select one of the multiple machine tool related processes;
a specific person authentication section configured to authenticate a specific person such that an entry operation via the display is restricted to only the specific person; and
a display menu changing section configured to receive an operation by an operator authenticated by the specific person authentication section to perform at least one of (A) changing of a display position of each of the free menu and the fixed menu on the process screen, and (B) changing the presence or absence of the display of each of the free menu and the fixed menu on the process screen.

Effects

A machine tool management of the present disclosure is configured to allow changes to be made to menus displayed on a process screen via a display menu changing section and to only allow a person certified by the specific person authentication section to make the changes related to the menus. Thus, according to the machine tool management device of the present disclosure, for example, it is possible to prevent someone other than a machine tool administrator from changing the menus, and when an administrator allows an operator to operate the machine tool, processes not to be performed by the operator can be removed from display on the menus.

BRIEF DESCRIPTION OF DRAWINGS

FIG. 6($a$) shows a first operation screen displayed on the display; FIG. 6($b$) shows a second operation screen displayed on the display.

FIG. 8($a$) shows a process screen for which the position of the shortcut menu has been changed; FIG. 8($b$) shows a process screen for which the display position of the fixed menu has been changed.

DESCRIPTION OF EMBODIMENTS

An embodiment of the machine tool management device of the present disclosure is described below with reference to the drawings. It should be noted that for the present disclosure, as well as the below embodiment, embodiments with various changes based on the knowledge of someone skilled in the art are possible.

Overall Configuration of Manufacturing Device

Figure 1:
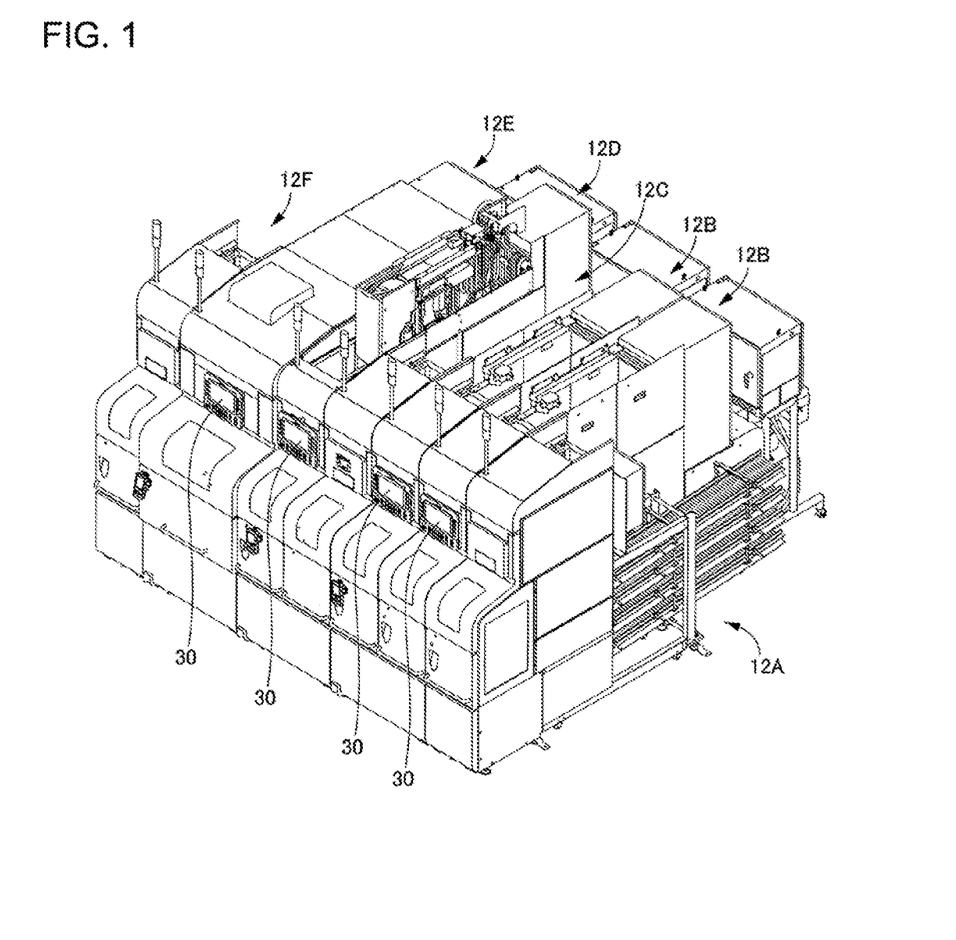
FIG. 1 is a perspective view of a manufacturing device configured to include a machine tool module provided with a machine tool management device that is an embodiment of the present disclosure.

FIG. 1 shows multiple work machine modules 12 (seven are shown in FIG. 1) in modular form that perform work with respect to a workpiece and are arranged in a single line, thus forming a manufacturing device in which the multiple work machine modules 12 are configured to perform consecutive work with respect to the workpiece. The seven work machine modules that configure the manufacturing device shown in FIG. 1 are, in order from the right, workpiece loading module 12A that loads the workpiece, two lathe modules 12B that performing cutting processing, inspection module 12C that inspects the workpiece processed by the two lathe modules 12B, milling module 12D that performs hole opening processing, hobbing module 12E that performs teeth cutting processing, and stock module 12F that stores completed products. As an embodiment of the present disclosure, machine tool management device is provided on the two lathe modules 12B, milling module 12D, and hobbing module 12E, which are work machine modules 12 including a machine tool among the seven work machine modules 12. In the descriptions below, these work machine modules 12B, 12D, and 12E that include a machine tool are sometimes referred to simply as machine tool module 12.

Figure 10:
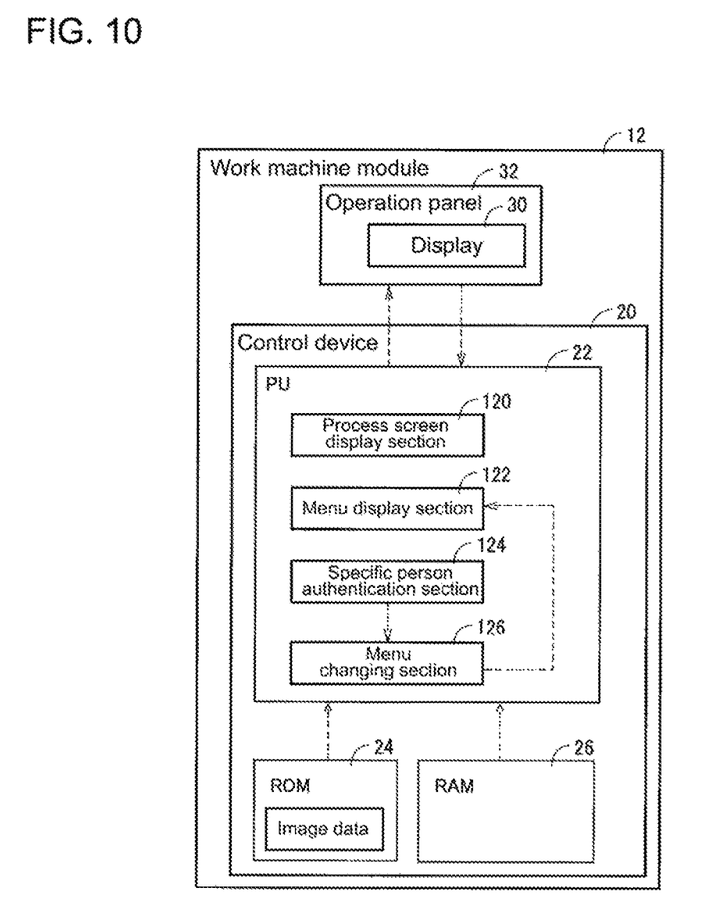
FIG. 10 is a block diagram showing functions of a control device of the lathe module of FIG. 1.

Each machine tool module 12 is provided with control device 20 that controls operation of the module (refer to FIG. 10). Control device 20 is configured mainly from a computer that includes PU (processing unit) 22, ROM (read only memory) 24, and RAM (random access memory) 26. A program and data for controlling general operation of work machine module 12 are stored on ROM 24, and as described in detail later, a program and various data for processing a workpiece inserted by an operator are stored in PAM 26.

Figure 2:
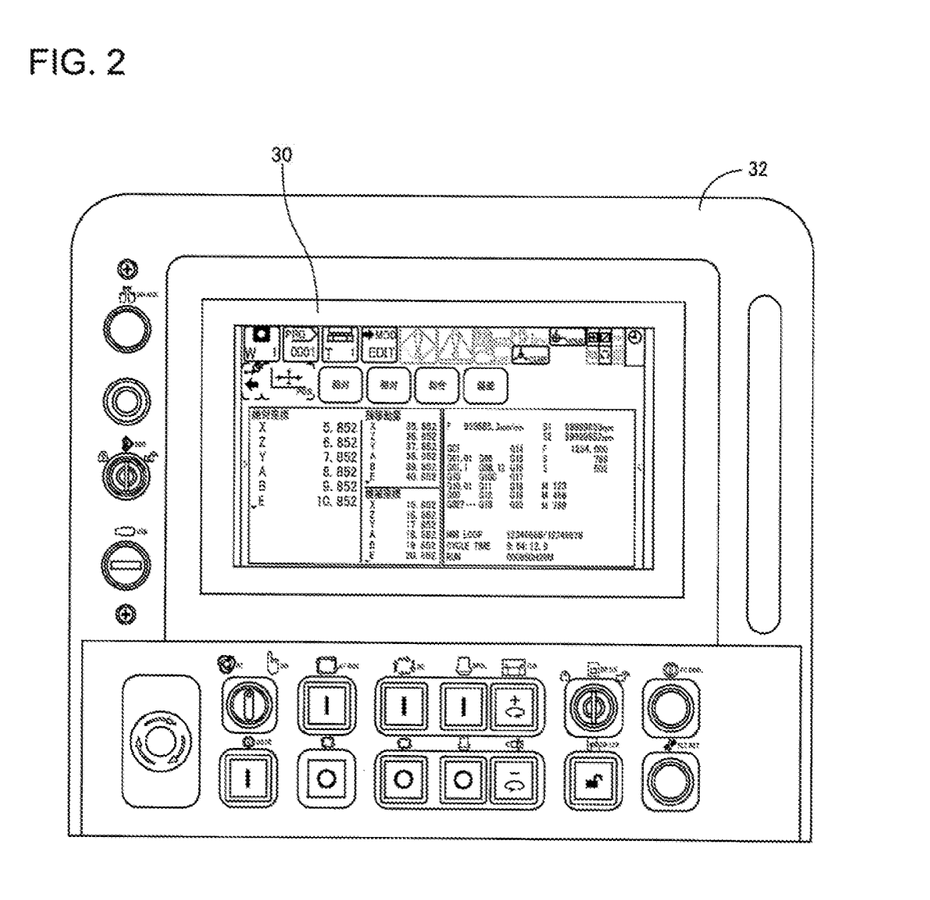
FIG. 2 is a front view of an operation panel including a display that configures a machine tool management device that is an embodiment of the present disclosure.

Also, each machine tool module 12 among the above work machine modules 12 is provided with operation panel 32 including display 30, and the screen displayed on display 30 is controlled by control device 20. FIG. 2 is a front view of operation panel 32. Operation panel 32 includes some hard buttons and the like, but is a touchscreen type such that operation and switching of the display screen and the like for the machine tool module 12 on which operation panel 32 is provided can be performed by touching display 30. Various types of image data displayed on display 30 are stored in ROM 24, and various types of data displayed on display 30, that is, information related to machine tool module 12 such as information related to the quantity of processed workpieces, information about attached tools, or the like, are stored in RAM 26.

Configuration of Machine Tool Management Device

The machine tool management device of the present disclosure is for managing machine tools of work machine modules 12 on which the device is provided and is configured to perform multiple machine tool related processes that are processes related to each of the machine tools. Further, the machine tool management device is configured to include display 30 and display 30 is used for input and output during the multiple machine tool related processes. Specifically, the machine tool management device displays information related to the machine tool on display 30, and is configured to, based on the entry of an operator via display 30, perform operation of the machine tool and registration of information related to the machine tool.

Figure 3:
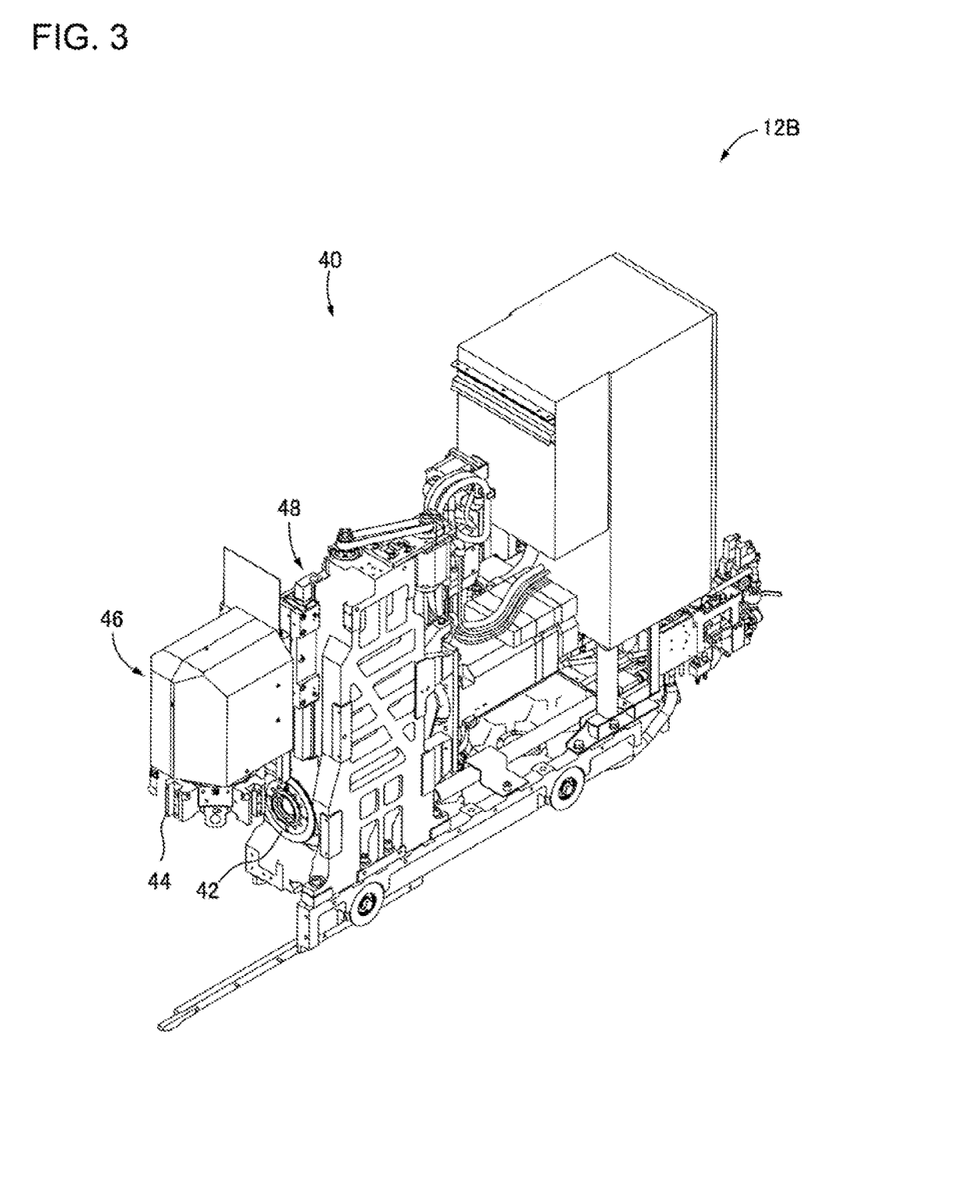
FIG. 3 is a perspective view of a machine tool main body of a lathe module that is one machine tool module provided with the machine tool management device that is an embodiment of the present disclosure.

FIG. 3 shows machine tool main body 40 of lathe module 12B that is one of the work machine modules 12. To simply describe lathe main body 40 that is a machine tool main body of lath module 12B: lathe main body 40 is configured to include spindle 42 for rotating a workpiece by rotating around its own axis, tool holding head 46 that holds multiple bites 44 that are each tools, and head moving device 48 that moves holding head 46 up and down and forward and back; the workpiece is held by a chuck provided on the tip of spindle 42, with cutting processing being performed by bite 44 held by tool holding head 46 while rotating the workpiece.

Figure 4:
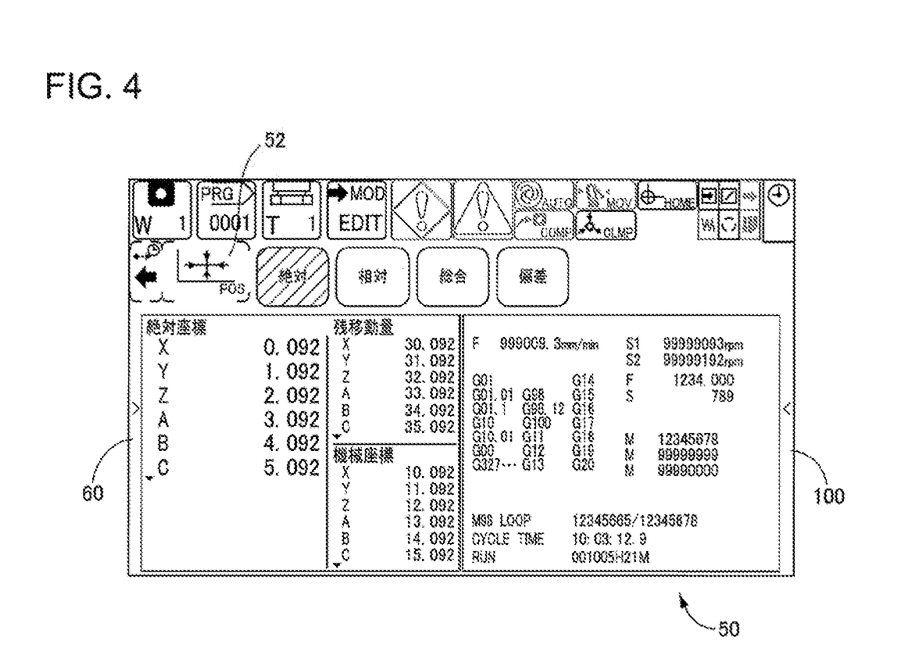
FIG. 4 shows an example of a process screen corresponding to a machine tool related process display on the display of the lathe module shown in FIG. 1.

An example of a process screen displayed on display 30 on lathe module 12B is shown in FIG. 4. Process screen 50 shown in FIG. 4 is a screen corresponding to a process that outputs information related to operation of the machine tool and is used for viewing items such as position information of each axis of the machine tool, set program code, and cycle time. Further, various icons are displayed on display 30 as well as the process screen. Icon 52 is for displaying an image of the process and an abbreviated name of the process such that the process corresponding to the process screen currently displayed on display 30 can be understood. In descriptions below, icon 52 may be referred to as the currently selected process icon 52. Note that, with the machine tool management device, when the currently selected process icon 52 is touched by an operator, fixed menu 54 (refer to FIG. 5) for selecting one of the multiple machine tool related processes is displayed on the process screen.

Figure 5:
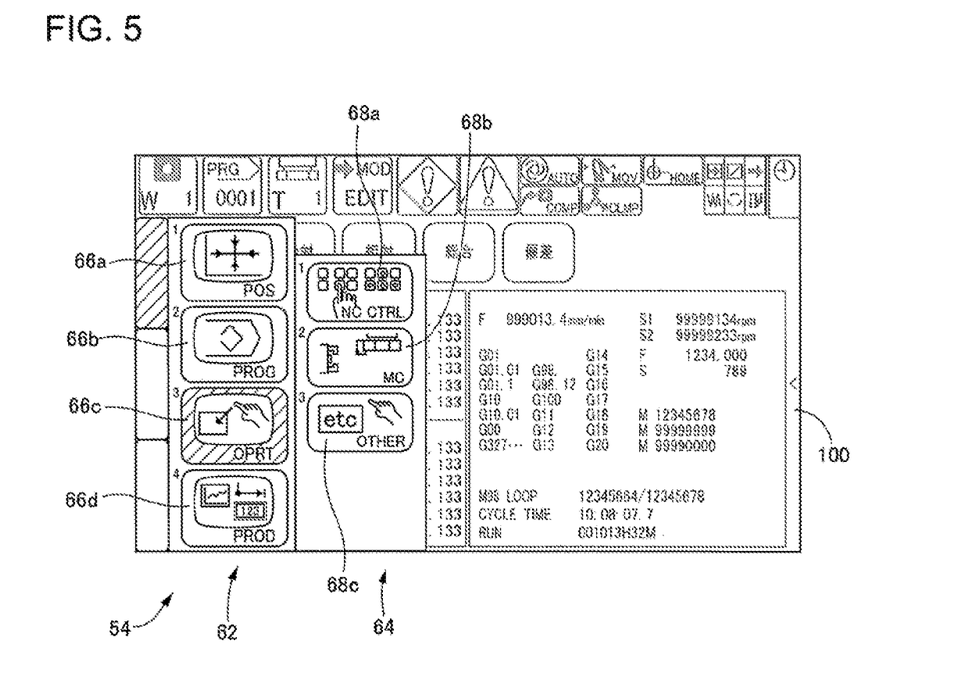
FIG. 5 shows a process screen on which a fixed menu is displayed.

Further, first menu icon 60 with a right arrow is displayed in a portion on the left edge of display 30. The machine tool management device, when an operator performs a swipe operation towards the right side from the first menu icon 60 (an operation of flicking a finger in a state contacting the screen), normally, displays the above fixed menu 54 on the process screen. Then, when the operator selects (touches) one of machine tool related processes displayed on fixed menu 54, the process screen corresponding to the selected machine tool related process is displayed on display 30.

Note that, to describe fixed menu 54 in detail, the column on the left side in FIG. 5 is main menu bar 62, and the column on the right side is sub-menu bar 64. In FIG. 5, four process icons, 66a, 66b, 66c, and 66d, are displayed in main menu bar 62, and other process icons are displayed by swiping up or down. A portion of the process icons 66 displayed in main menu bar 62, when selected, cause a sub-menu 64 corresponding to the selected process icon 66 to display to the right of main menu bar 62. When one of the process icons 68 corresponding to the machine tool related process displayed in sub-menu bar 64 is selected, a process screen corresponding to the machine tool related process of that process icon 68 is displayed. Note that, sub-menu bar 64 displayed in FIG. 5 is that displayed when the selected icon is process icon 66c related to machine operations of main menu bar 62.

When process icon 68b that is second from the top of sub-menu bar 64 in FIG. 5 is selected by an operator, the process screen 70 shown in FIG. 6(a) is displayed on display 30. Process screen 70 is a machine main body operation screen for performing processing to operate lathe main body 40 that is a machine tool main body, and various operation buttons and the like corresponding to various operations of lathe main body 40 are displayed on process screen 70. Process screen 70 displayed in FIG. 6(a) is a first operation screen, and in the machine tool management device of the present embodiment, separate to first operation screen 70, two other operation screens are prepared. One of those operation screens is second operation screen 72 that is the process screen shown in FIG. 6(b), and that displays operation buttons for performing operations other than operations of lathe main body 40 via the operation buttons displayed in first operation screen 70. Note that, the other process screen, that is, the third process screen is not shown in the figures. Three icons, 80a, 80b, and 80c representing first operation screen 70, second operation screen 72, and the third operation screen are displayed on each of the three operation screens.

Figure 6:
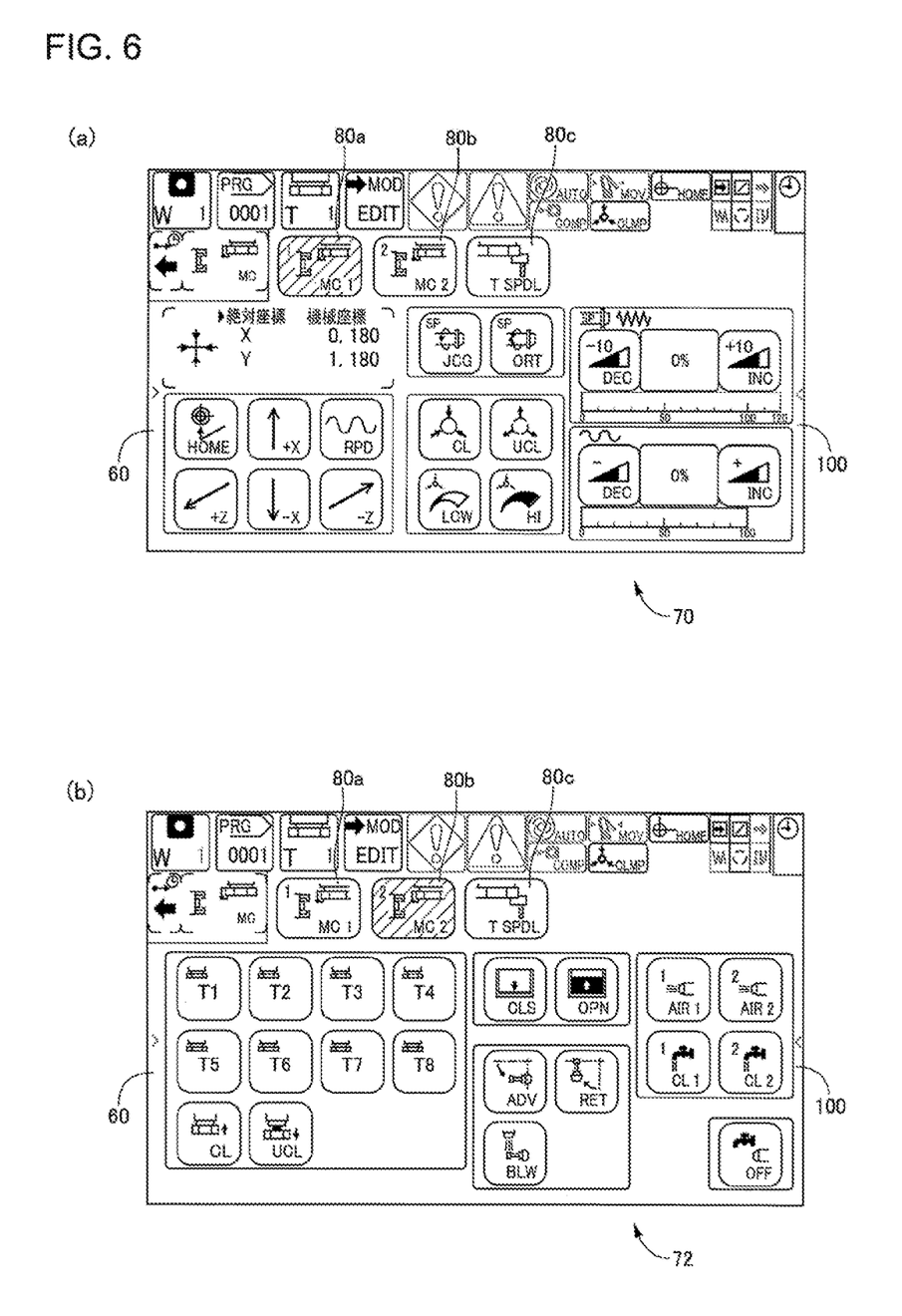

Of the three icons 80, the one corresponding to the operation screen currently displayed on display 30 is displayed in a different color to the other two icons (in FIG. 6, the icon is hatched). In other words, in first operation screen 70 shown in FIG. 6(a), icon 80a, and in second operation screen 72 in FIG. 6(b), icon 80b, are displayed in a different color to other icons. Also, of the three icons 80, the two icons not corresponding to the process screen currently displayed on display 30 are able to be operated by an operator, and when one is touched by an operator, the process screen corresponding to the touched icon 80 is displayed on display 30.

In other words, a process to operate lathe main body 40 performed via process screen 70 shown in FIG. 6(a) can be considered to be a fixed-menu-registered-process registered in fixed menu 54, and a process to operate lathe main body 40 performed via process screen 72 shown in FIG. 6(b) that can be displayed from process screen 70 but cannot be displayed from fixed menu 54 can be considered to be a fixed-menu-non-registered-process.

Figure 7:
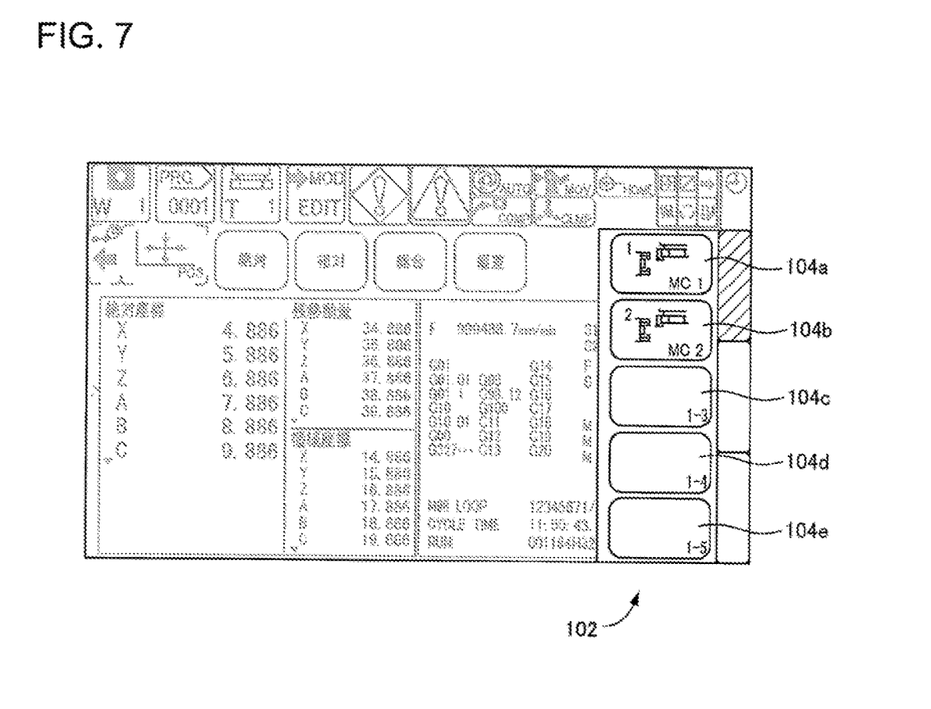
FIG. 7 shows a process screen on which a shortcut menu is displayed.

As shown in FIGS. 4, 5, and 6, second menu icon 100 with a left pointing arrow is displayed in a portion on the left edge of display 30. The machine tool management device, when an operator performs a swipe operation towards the left side from second menu icon 100, normally, displays shortcut menu 102 as a free menu as shown in FIG. 7 on display 30. Any of the multiple machine tool related processes can be registered in shortcut menu 102, up to a set quantity. Further, when one of the machine tool related processes displayed on shortcut menu 102 is selected, the process screen corresponding to the selected machine tool related process is displayed on display 30. Also, in FIG. 7, five process icons 104 (104a, 104b, 104c, 104d, and 104e) are displayed, but other icons are displayed by swiping up or down.

In the shortcut menu 102 shown in FIG. 7, process icons 104a and 104b for displaying first operation screen 70 and second operation screen 72 shown in FIGS. 6(a) and 6(b) are registered. In other words, in the machine tool management device, it is possible to register in shortcut menu 102 not only fixed-menu-registered-processes registered in fixed menu 54, but also fixed-menu-non-registered-processes. For example, to display second operation screen 72, normally, fixed menu 54 is displayed in process screen 50 shown in FIG. 4, process icon 66 in main menu bar 62 shown in FIG. 5 is selected, then process icon 68b of sub-menu 64 is selected, and further, process icon 80b in first operation screen 70 shown in FIG. 6(a) must be selected. However, with the machine tool management device, second operation screen 72 can be displayed by only displaying shortcut menu 102 in process screen 50 displayed in FIG. 4, and selecting process icon 104b of shortcut menu 102 shown in FIG. 7. Therefore, according to the machine tool management device, the work required to display the process screen corresponding to a fixed-menu-non-registered-process is reduced, thus reducing the time required to display the fixed-menu-non-registered-process.

Figure 8:
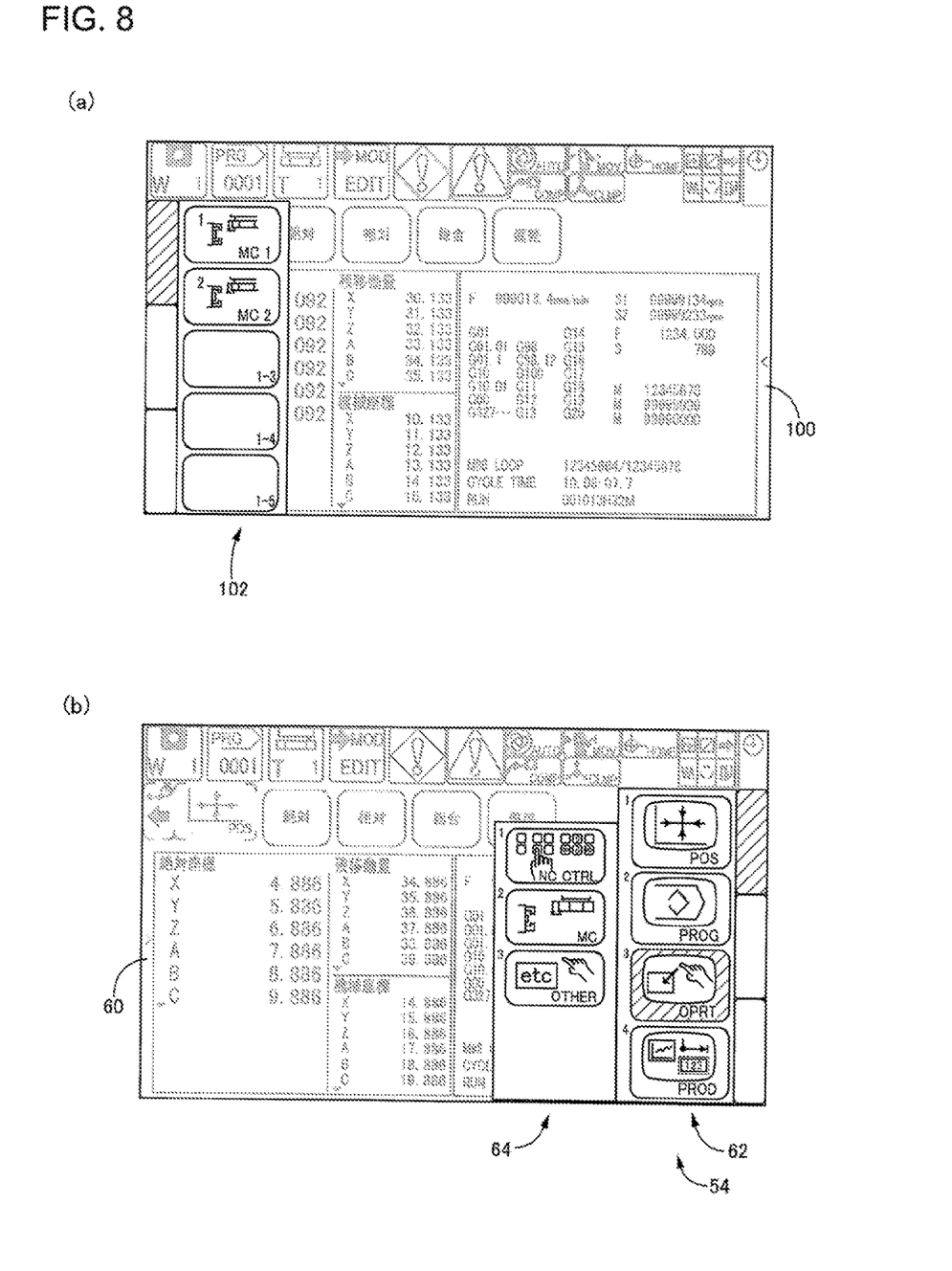

Also, the machine tool management device enables the display of the above menus 54 and 102 to be customized. Specifically, the position of fixed menu 54 and shortcut menu 102 displayed at the top of the process screen can be switched. In other words, as shown in FIG. 8(a), by displaying shortcut menu 102 from first menu icon 60, as shown in FIG. 8(b), it is possible to display fixed menu 54 from second menu icon 100. Further, it is possible to not display one of fixed menu 54 and shortcut menu 102 at the top of the process screen.

Figure 9:
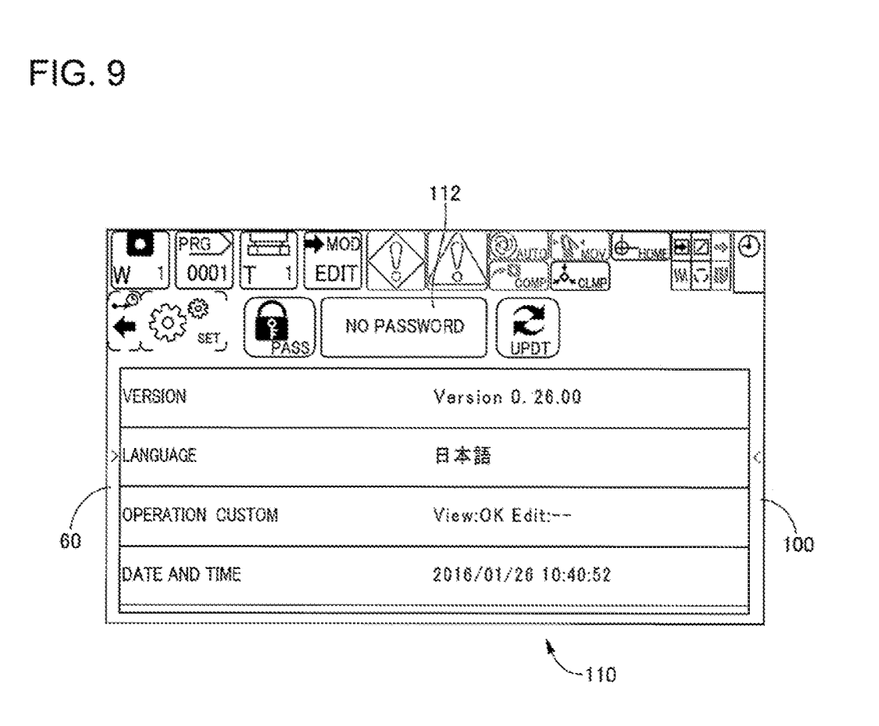
FIG. 9 shows a maintenance management settings screen provided with a location for entering a password for performing authentication of a specific person.

Further, the machine tool management device includes a function that restricts entry from display 30 and changes to a specific operator only, such that the above customization of menus 54 and 102, and changes to the processes registered to shortcut menu 102 can only be performed by a specific operator who has received authentication from the machine tool management device. Specifically, the machine tool management device displays maintenance management settings screen 110 (refer to FIG. 9) for performing setting processes related to maintenance management of the machine tool from fixed menu 54, and by the operator entering a password at entry location 112 in maintenance management settings screen 110, the operator is authenticated. Note that, the method of performing authentication of the specific operator is not limited to a password, various methods may be used, such as fingerprint authentication or authentication using an IC card.

Functional Configuration of Machine Tool Management Device

The configuration of the machine tool management device of the present embodiment will be described from the functional side with reference to FIG. 10. FIG. 10 is a block diagram for illustrating functions of control device 20 of machine tool module 12. Control device 20 of machine tool module 12 is provided with process screen display section configured to display on display 30 a process screen that is a screen corresponding to each of the multiple machine tool related processes, and menu display section 122 configured to display on the process screen each of fixed menu 54 and free menu 102 used for selecting one of the multiple machine tool related processes. Also, control device 20 is provided with specific person authentication section 124 configured to perform authentication of a specific operator so as to restrict input to display 30 to a specific operator, and menu changing section 126 configured to (A) perform changing of the display position on the process screen of each of fixed menu 54 and shortcut menu 102, and (B) changing the presence or absence of the display of each of fixed menu 54 and shortcut menu 102 on the process screen.

Note that, process screen display section 120, on the process screen corresponding to a portion of the machine tool related processes registered on fixed menu 54, displays a non-registered process icon representing at least one of the fixed-menu-non-registered-processes on display 30, and, when an operator performs an operation with respect to the non-registered-process icon, displays the process screen of the fixed-menu-non-registered-process represented by that non-registered process on display 30. Also, display menu display section 126 is configured to receive only an operation of an operator authenticated by specific person authentication section 124, and perform registering of machine tool related processes to free menu 102 and changing of the menu, and is configured to register not only fixed-menu-registered-processes but also fixed-menu-non-registered-processes.

Further, the machine tool management device includes process screen display section 120, menu display section 122, specific person authentication section 124, and display menu changing section 126.

Features of Machine Tool Management Device

With the machine tool management device configured as above, because the configuration is such that changes to the menus displayed on the process screen via display menu changing section 126 are only allowed by a person certified by specific person authentication section 124, for example, it is possible to prevent a person other than an administrator of the machine tool from changing a menu. Also, the machine tool management device, for example, when an administrator allows an operator to operate the machine tool, makes it possible for the administrator to not display menus that the operator should not operate. Specifically, the administrator may register only processes required for the operator in free menu 102, and specify settings to make fixed menu 54 not be displayed, and only to display free menu 102. From the viewpoint of the operator, according to the machine tool management device, because icons related to processes that are not required are not displayed on the menu, operating the machine tool is easy for the operator.

REFERENCE SIGNS LIST

12: work machine module; 12B: lathe module (machine tool module); 12D: drilling module (machine tool module); 12E: hobbing module (machine tool module); 20: control device; 22: CPU; 24: ROM; 26: RAM; 30: display 40: lathe main body (machine tool); 44: bite; 54: fixed menu; 60: first menu icon; 70: first operation screen (processing screen); 72: second operation screen (processing screen); 100: second menu icon; 102: shortcut menu (free menu); 110: maintenance management setting screen (processing screen); 112: password entry location; 120: processing screen display section; 122: menu display section; 124: specified person approval section; 126: display menu change section

The invention claimed is:

1. A machine tool management device for managing a machine tool, the machine tool management device comprising:
 a display on the machine tool configured to display and select image data; and processing circuitry configured to
  control the display to display a process screen on the display, the process screen being a screen corresponding to processes of the machine tool, the process screen including (a) a free menu at which it is possible to register any of the processes of the machine tool and (b) a fixed menu at which specific processes are displayed, the process screens corresponding to one of the processes of the machine tool being displayed on the display such that the menus are used for an operator to select one of the processes of the machine tool;
  authenticate a specific person such that an entry operation via the display is restricted to only the specific person; and
  receive an operation by an operator authenticated as the specific person to perform the entry operation via the display of at least one of (A) changing of a display position of each of the free menu and the fixed menu on the process screen, and (B) changing the presence or absence of the display of each of the free menu and the fixed menu on the process screen.

2. The machine tool management device according to claim 1, wherein
 the processing circuitry is configured to receive an operation by the operator authenticated as the specific person so as to perform registering and changing of the process on the free menu.

3. The machine tool management device according to claim 2, wherein
 in a case in which the process among the processes of the machine tool registered to the fixed menu is defined as a fixed-menu-registered-process and the process among the processes of the machine tool not registered to the fixed menu is defined as a fixed-menu-non-registered-process, the processing circuitry is configured to display on the display a non-registered process icon representing at least one of the fixed-menu-non-registered-processes on the process screen corresponding to at least one of the fixed-menu-non-registered-processes, and, when the operator performs the operation with respect to the non-registered process icon, to display the process screen of the fixed-menu-non-registered-process represented by the non-registered process icon on the display, and
 the processing circuitry is configured to receive the operation by the operator authenticated as the specific person so as to register both the fixed-menu-registered-process and the fixed-menu-non-registered-process on the free menu.

* * * * *